United States Patent [19]

Förster et al.

[11] 3,895,492

[45] July 22, 1975

[54] POWER PLANT

[75] Inventors: Siegfried Förster, Alsdorf, Ottenfeld; Günter Hewing, Julich; Peter Quell, Haaren, all of Germany

[73] Assignee: Kernforschungsanlage Julich, Gesellschaft mit beschrankter Haftung, Julich, Germany

[22] Filed: Dec. 26, 1973

[21] Appl. No.: 428,230

[30] Foreign Application Priority Data

Dec. 27, 1972 Germany............................ 2263559

[52] U.S. Cl.................................. 60/659; 165/166
[51] Int. Cl............................ F01k 1/00; F01k 3/00
[58] Field of Search........ 60/659, 682; 165/165, 166

[56] References Cited
UNITED STATES PATENTS

| | | | |
|---|---|---|---|
| 2,454,358 | 11/1948 | Traupel................. | 60/659 |
| 2,911,792 | 11/1959 | Rinia..................... | 60/682 |
| 3,785,435 | 1/1974 | Stein et al............. | 165/166 |

FOREIGN PATENTS OR APPLICATIONS

| | | | |
|---|---|---|---|
| 730,631 | 11/1943 | Germany............... | 60/682 |

Primary Examiner—Martin P. Schwadron
Assistant Examiner—H. Burks, Sr.
Attorney, Agent, or Firm—Walter Becker

[57] ABSTRACT

A power plant in which a turbine and compressor are mounted on a power developing shaft, with the turbine and compressor connected serially in a closed gas circuit. A heater is interposed between the compressor and turbine on the upstream side of the turbine and a cooler is interposed between the turbine and compressor on the downstream side of the turbine. Gas storage means is provided having valved connections with the upstream and downstream sides of the compressor. An outer circuit is provided open to the atmosphere at both ends and having therein a blower and a burner downstream from the blower. Cooling air for the cooler is taken off the downstream side of the blower, while heating air for the heater is taken from the downstream side of the burner. Controls are provided for initiating rotation of the shaft and for igniting the burner and for maintaining the pressure in the closed circuit within predetermined limits. The heat exchangers forming the heater and cooler are preferably coaxial and coextensive and include disc-like plates of heat conductive material to transfer heat between the heat exchange media. Power is taken off the shaft by a generator driven by the shaft.

26 Claims, 4 Drawing Figures

POWER PLANT

The present invention relates to a gas turbine installation in which the commpressor, heater, turbine, and a cooler arranged past the turbine outlet and simultaneously serving as air preheater for the combustion air are arranged in a closed gas circuit which is passed through by a working medium, and in which the cooler, combustion chamber and heater following said turbine are located in an outer gas circuit communicating with the atmosphere, heat exchanger means being provided for a heating exchange between the outer gas circuit and the closed gas circuit.

In gas turbine installations, the energy required for the energy conversion in the turbine is freed by burning fuel and is converted in part into mechanical energy. Gas turbine installations with open circuit are known in which air is drawn in from the atmosphere, is compressed, and by burning the fuel is heated in the compressed air. After giving work off to the turbines, the gases are exhausted into the atmosphere. It is known in gas turbine installations to provide recuperative or regenerative heat exchangers. The open gas turbine installations, however, are in particular for economic reasons not suitable for small power units nor for purposes where the generation of greatly variable output is involved as is the gas for instance when employing gas turbine installations for driving vehicles. Although gas turbine installations or gas turbine plants have the advantage that various fuels combustible with air can be used by them and that when employing liquid fossil fuels air polluting exhaust gases are produced to a considerably lower extent than when employing reciprocable piston engines, gas turbine installations have heretofore not been able to displace piston motors as drive for fuels. A further drawback for the employment as drive for motor vehicles consists in that the dimensions of the turbine installations or turbine plants are limited as to a minimum size in view of the necessity to drive the turbine installations by employing atmospheric air. A reduction in the output as it is necessary in connection therewith is possible only by lowering the temperature of the combustion gas. Another drawback which the heretofore known gas turbine installations have in common with the piston motor consists in that the specific fuel comsumption under partial load increases similar to that of a piston engine. In cases where gas turbine installations are employed as drive for vehicles, it has further been found necessary to split up the gas turbines in a high pressure and a low pressue part both of which are mechanically separated from each other. In this instance, a high pressure turbine drives the compressor only, whereas a low pressure turbine arranged on another shaft furnishes only the useful power while such two-shaft gas turbines have a favorable torque characteristic for the vehicle drive, the arrangement of high pressure turbine and low pressure turbine on separate shafts requires a relatively large space. In addition thereto with heretofore known gas turbine installations, it was not possible for the useful work-turbine shaft to absorb a brake moment, nor was it possible to start the turbine through said last mentioned shaft. It was furthermore disadvantageous with heretofore known turbine installations that with the turbine with open circuit, the turbine is directly exposed to the combustion gases. This brings about additional stresses. Finally another drawback of heretofore know turbine installations of the type consists in that the combustion device has to be under the pressure of some atmospheres and this has to taken into consideration by corresponding structural designs.

Gas turbines with closed gas circuit have likewise become known. With these gas turbines, a gas which does not come into contact with the combustion gases serves as circulating medium. The adaptation to the respective conveyed power output is effected by varying the quantity of the circulating working medium. However, the adaptability of the heretofore known gas turbines with closed gas circuit has been insufficient for the arrangement as drive for vehicles.

It is, therefore, an object of the present invention to provide a gas turbine installation with closed gas circuit in which the drawbacks of the heretofore known gas turbine installations, a fast change in the given-off output is to be obtained while also an accurate brake moment is to be absorbed. These and other objects and advantages of the invention will appear more clearly in the following specification in connection with the accompanying drawings, in which:

a. the arrangement of a turbo set comprising a turbine and a compressor, on a shaft with a power output or the connection thereof with the shaft for the turbo set by stepdown or step-up transmissions;

b. the arrangement of a storage device adapted to vary the pressure on the high pressure side and on the low pressure side of the closed gas circuit;

c. the arrangement of a blower driven by variable motor, in the feed line for the combustion air;

d. the arrangement of a control device temperature measuring device in the combustion chamber which measuring device is connected to a control device operable to vary the fuel supply;

e. the arrangement of a device which becomes effective automatically in conformity with a predetermined lower limit of the pressure in the closed gas circuit;

f. the arrangement of a control device for controling the pressure in the closed gas circuit and in the gas storage device and for controlling the speed of the blower for the combustion air and the fuel supply;

g. the arrangement of a control device for varying the fuel supply, the speed of the blower for the combustion air, the pressure level in the closed circuit and a starting device for the turbo shaft and the ignition device for the combustion chamber in order to realize different load conditions;

h. the arrangement of a monitoring device for the speed of the turbo shaft as well as the speed of an actuating device controlling the cross section of the bypass.

An advantage of the gas turbine plant according to the invention consists in that the speed of the turbo set, the maximum temperature of the working medium in the closed circuit, and the temperature of the combustion gases generated in the outer circuit can be kept approximately constant under all load conditions. Another advantage of the present invention is seen in the fact that the output of the blower for the delivery of the atmospheric air can under partial load be so reduced that in the partial load range, the specific fuel consumption will be equal or less than that under full load.

Expediently, as working medium in the closed circuit, air or another multi-atomic gas is employed. When using carbon dioxide as working medium, the specific fuel consumption will with a third of the full load be lower by approximately 40% than is the case with a comparable open gas turbine plant, but under full load is only higher by 10%.

It has proved advantageous so to operate the gas turbine plant according to the invention that the working medium in the closed gas circuit is under a pressure which is so much higher than the atmospheric pressure that the low pressure resulting from the circuit process inherent thereto will be greater than the atmospheric pressure. This has the advantageous effect that for instance when employing air as working medium and when the pressure of the air at the low pressure side amounted to about seven times the atmospheric pressure, it is possible in a closed gas circuit to employ turbines with an outer diameter which is smaller by approximately 60% then it would correspond to a gas turbine arranged in an open circuit and having comparable output.

An advantageous design of the gas turbine plant according to the invention consists in that the device which varies the pressure of the closed gas circuit comprises a gas storage device or a plurality of parallelly arranged gas storage devices which are respectively connected to the low pressure side and the high pressure side of the closed gas circuit by means of manually operable or controlled inlet and outlet valves. The possibility in view of the arrangement of one or more parallelly arranged gas storage devices to store the working medium in conformity with the respective need or to withdraw the working medium accordingly, brings about the result that the pressure level in the closed circuit is very precisely adapted to the respective manner of operation so that even under partial load conditions a very economic operation will be possible. The manner of operation is such that in response to a decrease in load, also the pressure level is lowered in the closed circuit and is lifted in response to load increases. The output that can be gained by employment of a closed circuit and while holding the maximum working mean temperature constant is approximately proportional to the pressure level in the closed gas circuit.

If in conformity with one embodiment of the gas turbine plant according to the invention, two or more gas storage means or accumulators are arranged in parallel to the closed gas circuit, it is advantageous to provide each gas accumulator for a change of the pressure level of the circuit for a predetermined pressure range. The higher the number of the gas accumulators provided for a predetermined changing range of the pressure level of the closed gas circuit, the smaller will be the storage volume required therefor. Thus, for instance, when providing two gas storage means of which each has approximately the same volumetric gas volume as the closed gas circuit, the changing range of the pressure level will be approximately 65%.

If for withdrawing stored medium from the closed gas circuit, a portion of the medium conveyed therein is withdrawn, it has proved expedient to cool that portion of the gas prior to feeding the same which is intended to be withdrawn from the storage means.

This is expediently carried out by providing a heat exchanger working in conformity with the generation principle, and more specifically by providing said heat exchanger in a conduit which connects the closed gas circuit with the storage means for feeding the gas, said heat exchanger being located in the outer gas circuit in front of the blower for feeding the combustion air. This heat exchanger is expediently designed as a regenerative heat exchanger. A corresponding design of the gas turbine plant according to the invention consists in that the regenerative heat exchanger comprises a container with cooling fins arranged on the outside thereof and also comprises a bundle of wires soldered to the inner wall and formed of solid well heat conductive wires and slightly spaced from each other.

It the gas to be withdrawn from the storage means as is intended is passed through the pressure vessel between the wire bundle it is possible without difficulties to carry out other withdrawals of gas following each other in short succession without the temperature of the gas leaving the heat exchanger increasing in temperature relative to the entrance temperature when passing through the cold heat exchanger. This brings about the additional advantage that the storage volume of the gas storing device may within the respective pressure level variation range be smaller than would be the case if the working medium were stored at a temperature which the working medium has past the compressor. In order at all load conditions of the energy withdrawal to keep constant the temperature of the gas leaving the combustion chamber or passing into the turbine, or in order to be able under certain circumstances where it would be necessary, to vary the temperature in order to set the pressure level in the closed gas circuit for bringing about variations in the load conditions, and furthermore for purposes of changing the fuel supply when starting and interrupting the fuel supply when turning off or if the combustion has reaches undue high temperatures, the gas turbine according to the present invention is provided with a control device.

The dosing or metering out of the fuel is in this connection expediently so effected that a fuel supply is effected only above a minimum speed of the blower for feeding the combustion air. The fuel dosing is in conformity with speed of the blower so controlled that the quantity of the fuel flowing into the combustion chamber is approximately proportional to the quantity of air delivered by the blower. This has the advantage that a feeding or a supply of fuel is effected only after the starting speed has been reached. A further advantage consists in that in this manner it will be assured that with all possible load conditions, the combustion gases will be approximately constant temperature.

Furthermore, in a feeding line to the gas storage device there is provided a shut-off valve which when the pressure drops in the closed gas circuit in view of possible leakage, will automatically open and which when the required pressure level has been reached will automatically close. If air is used as working medium in the closed gas circuit, it is possible instead to provide a pump which in response to the pressure in the closed gas circuit drops below a predetermined pressure is automatically turned on whereas it is turned off when the required pressure has been established.

In order also to bring about load conditions which are not obtainable by the arrangement of a pressure level control created by the arrangement of a selective turning on of the gas storage means for adding or withdrawing the working medium, it is advantageous that in the closed gas circuit between the gas outlet of the compressor and the turbine outlet there is provided a bypass line in which a valve is arranged which is manually adjustable and/or communicates with a control device. In this way, it will be realized that a partial load operation can be carried out up to the output 0 and that also, as this is very much desired in connection with the driving of motor vehicles, brake power can be absorbed by the turbo set in which the size of the turbo engines arranged in the gas turbine plant according to the invention in the closed gas circuit depends on the power to be generated and the pressure level to be created in the gas circuit. With an actual output of approximately 85 KW while employing air as working medium and with a maximum desired pressure in the closed gas circuit of 25 bar, the employment of radial compressors and centripetal turbines have proved favorable. With a power exceeding ten times the above mentioned actual power, it is more expedient to employ axial turbines. In this instance as compressors there are expediently employed compressors of the axial and radial type. Thus, it is expedient that turbo engines arranged in the closed gas circuit are designed as radial and/or axial machines. A preferred design of the gas turbine plant according to the invention is based on the finding that it is necessary to assure that in response to changes in the load, the gas temperature prevailing ahead of the turbine in the closed gas circuit drops below a predetermined temperature which should be held at least approximately constant. To this end it is necessary to adapt the pressure level in the closed gas circuit to the respective freed heat energy in the combustion chamber. In order to realize this, a pressure measuring device is arranged at the low pressure side of the closed gas circuit which pressure measuring device is connected to a control device known per se that changes the speed of the drive for the blower for feeding the combustion air in conformity with the pressure level in the closed gas circuit.

Such an arrangement will bring about for instance that when the actual or useful load drops in view of a reduction in the quantity of air passing through in the open circuit, the output of the blower is reduced to a greater extent than the useful power. This in turn brings about an additional drop in the gas temperature at the inlet side of the compressor. Consequently and in view of the coupling degree of efficiency only slightly changing in view of the pressure level control in the closed gas circuit, it will be brought about that the coupling degree of efficiency will be better with partial loads than with full loads.

In order to assure that the gas turbine plant according to the invention can also furnish useful power which is less than the useful power in view of the arrangement of the pressure level control in the gas turbine plant, if is expedient that the pressure measuring device is connected with a control device which communicates with a valve in the bypass, and is so arranged that when the pressure has dropped below a predetermined pressure in the gas circuit, the valve opens and is closed when the predetermined pressure measuring value is exceeded.

For starting and turning off the gas turbine plant according to the invention there is additionally provided a control device by means of which in a predetermined manner there is set the pressure level in the closed gas circuit, the bypass setting, the speed of the blower for conveying combustion air, and the fuel dosing, and the starting motor arranged on the turbo set shaft and the ignigion device in the combustion chamber are turned on and off.

Inasmuch as the closed gas circuit is under an over-pressure relative to the atmosphere, it has proved particularly expedient to employ gas dynamic bearings for journaling the shaft of a turbo set arranged in the closed gas circuit and of an electric generator driven by said turbo set, especially between the high pressure side of the compressor and of the turbine. However, it is also possible to employ a journaling system customary with high speed turbines. It is, however, expedient to provide a gas dynamic bearing system between the high pressure side of the compressor and the turbine of the turbo set.

Inasmuch as the gas turbine plant according to the invention is expediently so operated that the closed gas circuit is under an over-pressure, the cross sections for connecting the gas conduits in the devices provided in the closed gas circuit, so small it will be possible that the turbo engines and the electric generators can be arranged within a pressure container which by detachable gas connections is connected to the remaining portions of the closed gas circuit and is under pressure. This presssure container may be arranged independently of the remaining parts of the gas turbine plant or also within the gas turbine plant.

A further development of the gas turbine plant according to the invention consists in that in or on the generator for furnishing power there are provided cooling passges which communicate with a cooler. The said cooler is passed through by working media conveyed in the closed gas circuit. The said cooler is located in a gas conduit which is branched off from the blower for furnishing and feeding the combustion. For additional conveying the working medium, the shaft on which the generator is mounted also has arranged thereon a blower which conveys that portion of the working medium which serves for cooling the generator, to the inlet side of cooling passages located within or on the generator.

It is expedient that the blower for conveying the cooling medium for the generator is variable in conformity with the output of the generator. The arrangement provided in the gas turbine plant according to the invention for the heat exchange between the closed gas circuit brings about that the heat energy conveyed to the closed gas circuit corresponds to the amount of energy which is necessary to bring to the desired temperature of the combustion gases the air of the outer circuit which was preheated simultaneously with the necessary cooling of the working medium in the closed gas circuit. The quantity of heat energy to be added will be the smaller the smaller the temperature differential between the working medium to be cooled and the air to be preheated for the combustion at that place where the air is heated up to its highest temperature, and likewise between the combustion gases and the working medium heated at the area where the combustion gases reach the highest temperature. For this reason it is expedient that one or more heat exchangers designed for the heat exchange between the closed gas circuit and the opened gas circuit are so designed that the heat exchanging media are conveyed in countercurrent while the heat exchanger matrix provided in this connection has a disc shape and is so arranged that the planes of the disc are passed through by the respective intercrossing gas currents of the closed and of the outer gas circuit in the direction of the normal.

If the heat exchanger matrix is disc shaped, it is expedient that the heat exchanger for the working medium conveyed in the closed circuit gas accumulators are connected with the matrix surfaces and that for the air conveyed in the outer circuit or for the combustion gases gas accumulators communicate with tubular gas conduits while the gas accumulators are so arranged that always gases of the same type are received by the gas conduits.

It is also very advantageous that one or more of the heat exchangers which are provided for the heat exchange between the closed gas circuit and opened gas circuit are cyclindrical and are so arranged that the thus formed cylindrical surfaces are in the direction of the normal passed through from the respective intercrossing gas currents of the closed and of the outer gas circuit. The employment of heat exchangers designed in this manner has the additional advantage that due to their compact construction they require only relatively small space.

A particularly advantageous design of the turbine installation with regard to space saving is in conformity with the invention obtained by arranging the heat exchangers coaxially with regard to each other and arranged the same in such a way that the inner heat exchanger is passed through by combustion air to be heated from the inside toward the outside whereas the outer heat exchanger is passed through by combustion gases from the inside toward the outside.

With regard to the degree of efficiency it is advantageous so to design the heat exchangers that for the working medium conveyed in the closed gas circuit and for the air guided in the outer gas circuit or the combustion gases on the matrix surfaces of the heat exchanger there are provided gas accumulators which communicate with tubular gas conduit and are so connected that respectively gases of the same type are absorbed by the gas conduits.

It is also very advantageous to design one or more of those heat exchangers cylindrical which are provided for the heat exchange between the closed gas circuit and the open gas circuit and it is further advantageous so to arrange these cylindrical heat exchangers so that the cylinder surfaces formed thereby are passed through in the direction of the normal by the respective intercrossing gas currents of the closed and the outer gas circuit. The employment of the thus designed heat exchangers additionally has the advantage that they require due to their compact design only a relatively small space.

A design of the gas turbine plant which is particularly advantageous with regard to the space saving feature according to the invention is obtained by arranging the heat exchangers coaxially with regard to each other and arranging the same in such a way that the inner heat exchanger is passed through by the combustion air to be heated from the outside toward the inside, whereas the outer heat exchanger is passed through by the combustion gases from the inside toward the outside.

With regard to the degree of efficiency it is advantageous so to design the heat exchanger that for the working medium conveyed in the closed gas circuit and for the air conveyed in the outer gas circuit or for the combustion gases on the matrix surfaces of the heat exchangers gas collectors are provided which are parallel to the direction of the axis and are in communication with gas conduits arranged at both ends of the heat exchanger and are preferably annular or spiral shaped, while this connection is such that the two gas currents entering and leaving on one side of the heat exchanger matrix are received by one of the gas conduits arranged opposite to each other.

A particularly space saving design of the gas turbine plant according to the invention is obtained due to the fact that it has proved fully sufficient to make the distances between the plates of the heat exchanger matrices for the working medium of the closed gas circuit smaller or at maximum equal to the distances between the plates for the combustion air or the combustion gases of the outer circuit.

A further expedient design of the gas turbine plant according to the invention consists in that the blower with a coaxial arrangement of the heat exchanger on the air inlet side is coaxially arranged with the heat exchangers and through an annular conduit communicates with the gas collectors for the air inlet of the heat exchanger provided as air preheater.

A further development of the gas turbine plant according to the invention consists in that on that shaft which supports the blower and the drive motor for the blower there is provided a fuel atomizer which rotates with the shaft and supplies fuel into the space forming the heat chamber and into the combustion chamber, said atomizer extending into said space. In this way a fine atomization of the fuel over a minimum space is realized. An advantage of this design of the gas turbine plant according to the invention consists in that it is not necessary to provide a delivery pump. In order to assure a proper operation, the space receiving the fuel atomizer is sealed in a gas tight manner relative to its surrounding. The pressure prevailing in said space or chamber substantially equals the pressure behind the blower provided for conveying the combustion air.

If, as it is intended a generator is provided for furnishing power, this generator is expediently subdivided into two sections in such a way that one section serves for furnishing the power to the drive motor for the blower whereas the other section serves for furnishing useful power. For purposes of starting the turbo set from a standstill, there is provided either an auxiliary coil on a section of the generator for operating said generator as motor, or additionally to the generator there is provided a disengaging starting motor.

In order with the gas turbine plant according to the invention to be able within predetermined limits it will to obtain any desired load conditions, an actuating device provided with the gas turbine plant according to the invention which is so designed that the control device for bringing about different load conditions comprises a load actuating member and a brake actuating member and through a control member is operatively connected to inlet and outlet valves arranged on the gas storage device for the closed gas circuit and if desired to a valve in the bypass in such a way that the pressure level in the closed gas circuit and if desired the cross section of the bypass conduit is adapted to the required load torque or the brake torque. The rest positions resulting from the influence of the forces of a spring and a counterbearing onto the actuating members correspond to the lost pressure level of the pressure height control which results in the closed gas circuit from the connection with the gas storage device. A speed measuring device for measuring the turbo speed is is operatively connected to a valve in the bypass and to the control device for the fuel suppy and is so arranged that the speed remains constant. In order to prevent that in case that due to the combustion gases unduly high temperatures are obtained the gas turbine plant could be damaged, it is expedient that in the combustion chamber there is arranged on or a plurality of thermal elements and is operatively connected to the control device which is operatively connected to the fuel supply, in such a way that when a certain upper temperature limit is exceeded, the fuel supply will be interrupted or reduced.

It is furthermore advantageous to provide a fuel container which is under the air pressure generated by the blower for the combustion air. This brings about that also when the fuel level is lower than that at the fuel feeding point, fuel will be conveyed to the combustion chamber without the necessity of providing a fuel pump in this instance.

In order to prevent air impurifications from entering the outer gas circuit, it is expedient to provide an air filter in front of the blower for feeding the combustion air. The exhaust gases escaping from the open gas circuit have a temperature in the vicinity of 200°C. In order to exclude the danger of damages caused thereby, it is expedient that the end of the exhaust gas conduit is subdivided into a plurality of outlets or that at the end of the exhaust gas conduit there is provided a known device for mixing exhaust gases with surrounding air.

Figure 1:
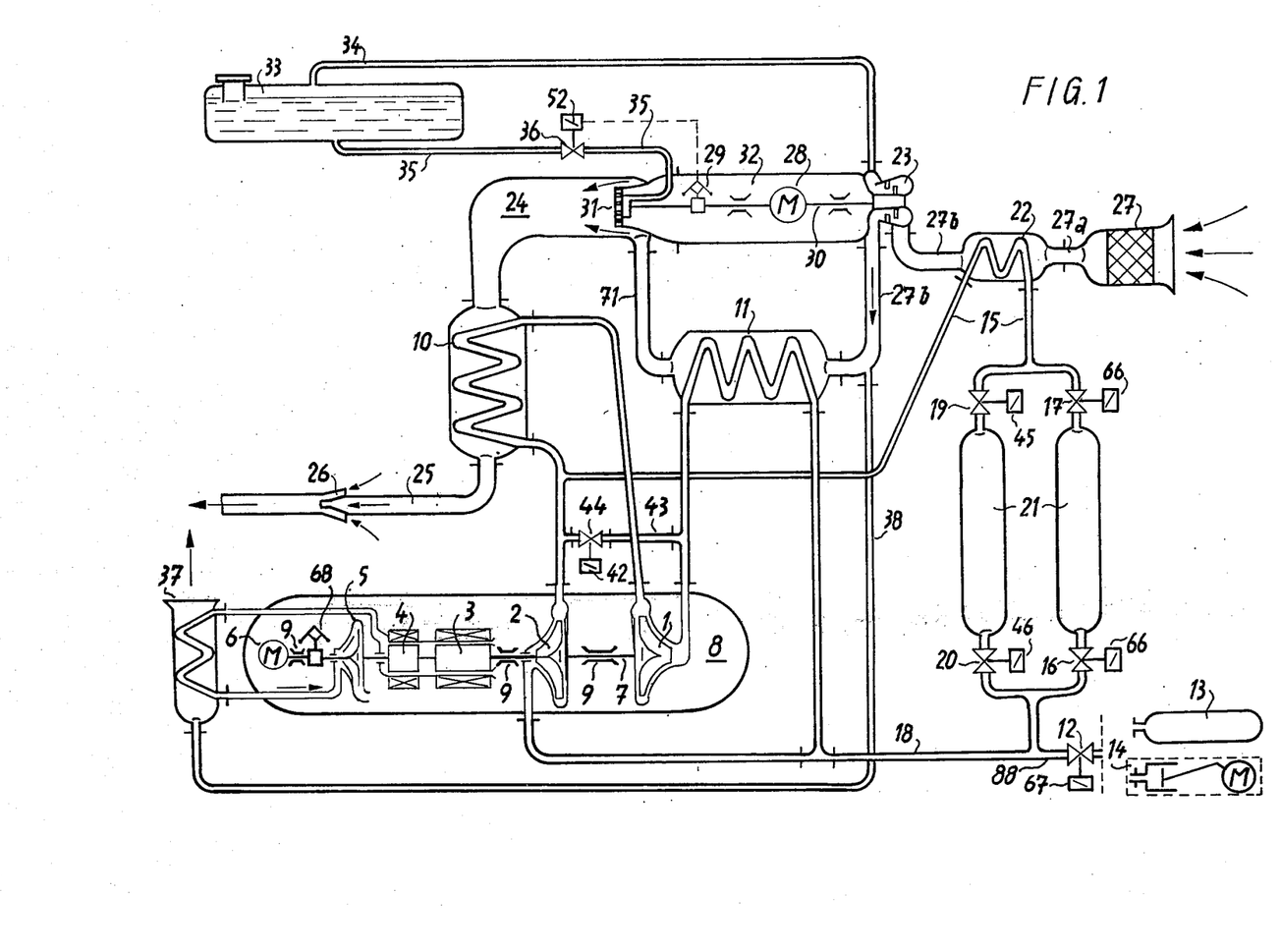
FIG. 1 is a diagrammatical illustration of the gas turbine plant according to the invention.

Referring now to the drawings in detail, the arrangement illustrated therein comprises a gas turbine 1, a compressor 2, a first generator 3 provided for furnishing useful work, a second generator 4 for generating the power to drive a blower motor for the combustion air, a blower 5 for cooling the generators 3 and 4, and a starting motor 6. The turbine 1, the compressor 2, the generators 3 and 4, the blower 5 and the starting motor 6, are all mounted on a common shaft 7 within a container 8 which is under pressure. The bearings 6 provided for the shaft 7 are adapted to be subjected to transverse and longitudinal forces. The compressor 2, a heater 10, the turbine 1, and a cooler 11 are in the just mentioned sequence in a closed gas circuit passed through by a working medium. The closed gas circuit communicates through a valve 12 with a high pressure container 13, or if as working medium air is employed communicates with a compressor 14 coupled to a motor so that it is possible to compensate for possible losses in the working medium in the closed gas circuit. In this connection it is to be borne in mind that in the heater 10 the highest pressure exits due to the compression of the working medium by the compressor 2 and due to the heating up of the working medium. In view of the expansion of the working medium when the latter leaves the turbine 1, and due to the cooling off of the working medium in the closed gas circuit, the lowest pressure exists in the cooler 11. Furthermore, the closed gas circuit communicates through a conduit 15 and through valves 17 and 19 at the high pressure side and furthermore through a conduit 18 and valves 16 and 20 with two gas storage means or accumulators 21 which are arranged in parallel to each other. Instead of the two gas accumulators 21, also more gas accumulators or storage means may be provided or they may also only one gas accumlator be provided. In order to increase the storage capacity of the gas accumulators 21, a cooler 22 for cooling the working medium is provided at the high pressure side of the gas accumulator 21 in the conduit 15. In view of the pressure differences prevailing in the closed circuit, it is possible without difficulty at the high pressure side of the circuit to have the gas accumulators 21 to receive a portion of the working medium, inasmuch as the pressure in the gas accumulators, as intended, is lower than the pressure in the closed gas circuit at the high pressure side. Inversely, on the low pressure side gas may be withdrawn from the gas accumulators 21 and passed into the closed gas circuit, because the pressure in the gas accumulators is higher than the pressure at the low pressure side of the closed gas circuit.

In the outer circuit which communicates with the outer air, there is provided an axial blower 23 for drawing in air. Furthermore, in said outer circuit there is also arranged a cooler 11 for the working medium which cooler simultaneously serves for preheating heating the air. The outer circuit also contains the heater 10 which through an exhaust gas conduit 25 conveys the combustion gases generated in the combustion chamber 24 to the surrounding by means of the gas mixture 26. The axial blower 23 is preceded by a filter 27 and by the storage gas cooler 22 which simultaneously serves for preheating the air. For purposes of driving the axial blower 23 there is provided a motor 28 which at the same time with a speed governor 29 is mounted on a common shaft 30 with the axial blower 23. Furthermore arranged on shaft 30 is a fuel atomizer 31 in such a way that it simultaneously forms a part of the outer confinement of a container 32 which is under the pressure prevailing at the blower exit side. Inasmuch as the container 32 is located directly adjacent to the combustion chamber 24, the fuel atomizer 31 forms at least a portion of the common confinement between combustion chamber 24 and container 32.

Furthermore, at the exit of the axial blower 23 there is provided a conduit 34 communicating with the fuel container or tank 33. In this for under pressure will act upon the tank 33 so that the fuel supply to the fuel atomizer 31 will be assured even under unfavorable conditions through the fuel conduit 35 located between the tank 33 and the fuel atomizer 31. As will be seen from the drawing, in the fuel conduit 35 there is additionally arranged a valve 36 which is adapted to be controlled by a speed governor 29 arranged on shaft 30. The exit of the axial blower 23 is additionally in communication with a conduit 38 leading to the cooler 37. The cooler 37 serves for cooling the generators 3 and 4 mounted on shaft 7, in which generators cooling passages are provided for this purpose. By means of the cooling passages provided in the generators 3 and 4, and by means of a blower 5 arranged on a shaft 7, the working medium which is under the lowest pressure of the closed gas circuit is circulated and cooled by the cooler 37.

Figure 2:
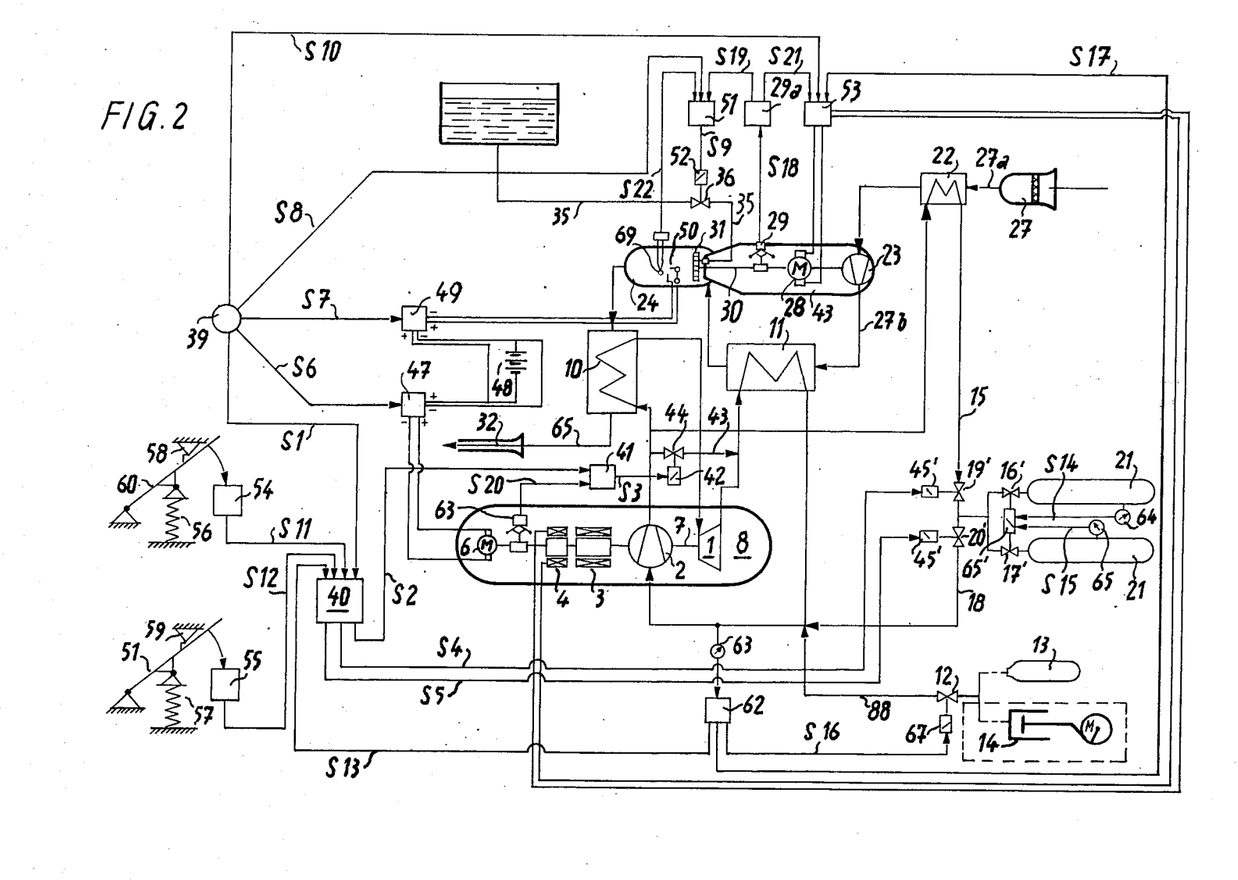
FIG. 2 shows an embodiment of a control device for the gas turbine plant of FIG. 1.

As will be best seen from FIG. 2, the gas turbine plant according to the present invention is started by means of an acutating member 39 known per se. This is effected in such a way that through the intervention of a control path s1, a main control member 40, and from and through a control path s2, as well as over a control path s3 and the control motor 42, and a further control member 41, a valve 44 is opened which is located in a by-pass 43 adapted to interconnect the high pressure and low pressure sides of the closed gas circuit. Furthermore, by means of the actuating member 39 through path sl, the control member 40, paths s4 and s5, and through the intervention of control members 45 anad 46, the position of the valves 19' and 20' which control the pressure level in the closed gas circuit, and through a control path s6 and a control member 47, the shaft 7 is started by means of a starting motor 6 fed by a battery 48. By means of the actuating member 39, a control member 49 is simultaneously with the above mentioned operations actuated through a control path s7, and by means of a pre-glowing device 50 fed by a battery 48, ignition in the combustion chamber 24 is actuated. In view of the actuation of the actuating member 39 a control member 51 is actuated through control path s8, whereas through a further control path S9 a control member 52 is actuated with the result that the control valve 36 for the fuel is set. Through the control path s10, a control member 53 is actuated by the control member 39 with the result that the speed of the motor 28 for the axial blower 23 electrically driven by the generator 4 is adjusted for the combustion air.

For adjusting the desired load torque and the braking torque there are provided a load actuating member 54 and a brake actuating member 55. Both actuating members are held in a fixed rest position by a spring 56 or 57 and a counterbearing 58 or 59 respectively. An actuation of the actuating members 54 and 55 is as shown in FIG. 2 conveyed through rated value indicators 60 and 61 and control paths s11 and s12 conveyed to the main control member 40. The main control member 40 has additionally superimposed thereupon a pressure through the path s13 and a measured value distributor 62. The said pressure is measured by a pressure gauge 63 which is arranged on the low pressure side of the closed gas circuit. The main control member 40 through control paths s4 and s5 and the adjusting members 45 and 46 controls the valve 19' in the withdrawn conduit 15 and the valve 20' in the feeding line 18 of the closed gas circuit. Furthermore, by means of the main control member 40 through the control path s2, the control member 41, the control path s3, and the control member 42, the position of the valve 44 located in the by-pass line 43 is controlled. The valves 16' and 17' which are located in the conduits leading from the gas storage device to the gas conduits 15 and 16 are so arranged that always one of the two valves is closed during the control of the valves 19' and 20' located in the gas conduits 15 and 18 leading to the closed gas circuit, whereas the other one of said first mentioned two valves 16' and 17' is closed. Which of the two valves 16' and 17' is opened and which is closed depends on the pressure in the individual storage containers 21 because the measuring signals emitted by one of the pressure measuring devices 64 and 65 for measuring the pressure in each of the gas storage means are, through the paths s14 and s15 conveyed to a control member 66' by means of which the valves 16' and 17' are set in conformity with the pressure level.

According to the embodiment illustrated in FIG. 1, the valves 17 and 19 provided in the high pressure of the gas storage device 21 are so arranged or set that always one of the two valves is opened during the control of the valves 16 and 20 located in the conduits 15 and 18 leading to the closed gas circuit, while the other one of the two valves 17 and 19 is closed. Which of the two valves 17 and 19 is opened and which one is closed is also in this instance dependent on the pressure in the individual storage containers 21 because the valves at the control members 45, 46 and 66 are adjusted in conformity with the pressure level.

The valve 12 provided in the conduit 88 for post feeding the closed gas circuit is so controlled that it can be opened only when the pressure in the closed circuit on the low pressure side drops below a predetermined minimum value. The control of valve 12 is effected by means of a control member 67 in conformity with a signal which is emitted by the pressure gauge 63 arranged in the closed gas circuit. The signal is conveyed to the measured value distributor 62 and through a path s16.

In order to assure that the quantity of combustion air conveyed by the blower 23 is appoximately proportional to the pressure level in the closed gas circuit, the speed of the motor 28 for driving the blower 23 is controlled by means of the control member 53 which receives a corresponding signal from the pressure gauge 63 through the distributor 62 and a path s17. The fuel supply is, by means of the valve 36 in the fuel line 35 and by the atomizer 31 controlled in such a way that in the combustion chamber 24 there will be generated a predetermined combustion temperature which is approximately constant. This is brought about by the fact that the measured values emitted by the speed gauge 29 arranged on shaft 30 for the blower 23 are converted in signals and are through a path s18, a distributor 29a, a path s19, the control member 51, the path s9, and the control 52 are conveyed to the control valve 35 arranged in the fuel supply line 35.

With the gas turbine plant according to the invention, there is furthermore provided a monitoring device for monitoring the speed of the shafts 7 and 30 and of the temperature in the combustion chamber 24. The checking function resulting therefrom is superimposed upon the function of the control device. For checking the speed of shaft 7, this shaft has arranged thereon a speed gauge 68. The measuring signal corresponding to the respective speed of rotation is conveyed through a measuring path s20 to the by-pass control member 41. If a predetermined speed of shaft 7 is exceeded, by the emission of a signal to the control member 42 via a control path s3, it is brought about that the by-pass valve will be opened.

Similarly, the speed of shaft 30 is monitored. This is brought about by the fact that a signal is conveyed to the control member 53 which controls the speed of the drive motor 28 for the blower 23 by the speed gauge 29 through the path s18, the distributor 29a, and the path s21. If the temperature in the combustion chamber 24 exceeds a predetermined admissible maximum value, a measuring signal generated by a thermo element 69 arranged in the combustion chamber 24 is conveyed to the fuel control member 51 through path s22. The fuel control member 51 will then, in view of the emission of a signal to the adjusting member 52 through path s9 shut the fuel valve 36 and thereby the fuel supply to the combustion chamber.

Figure 3:
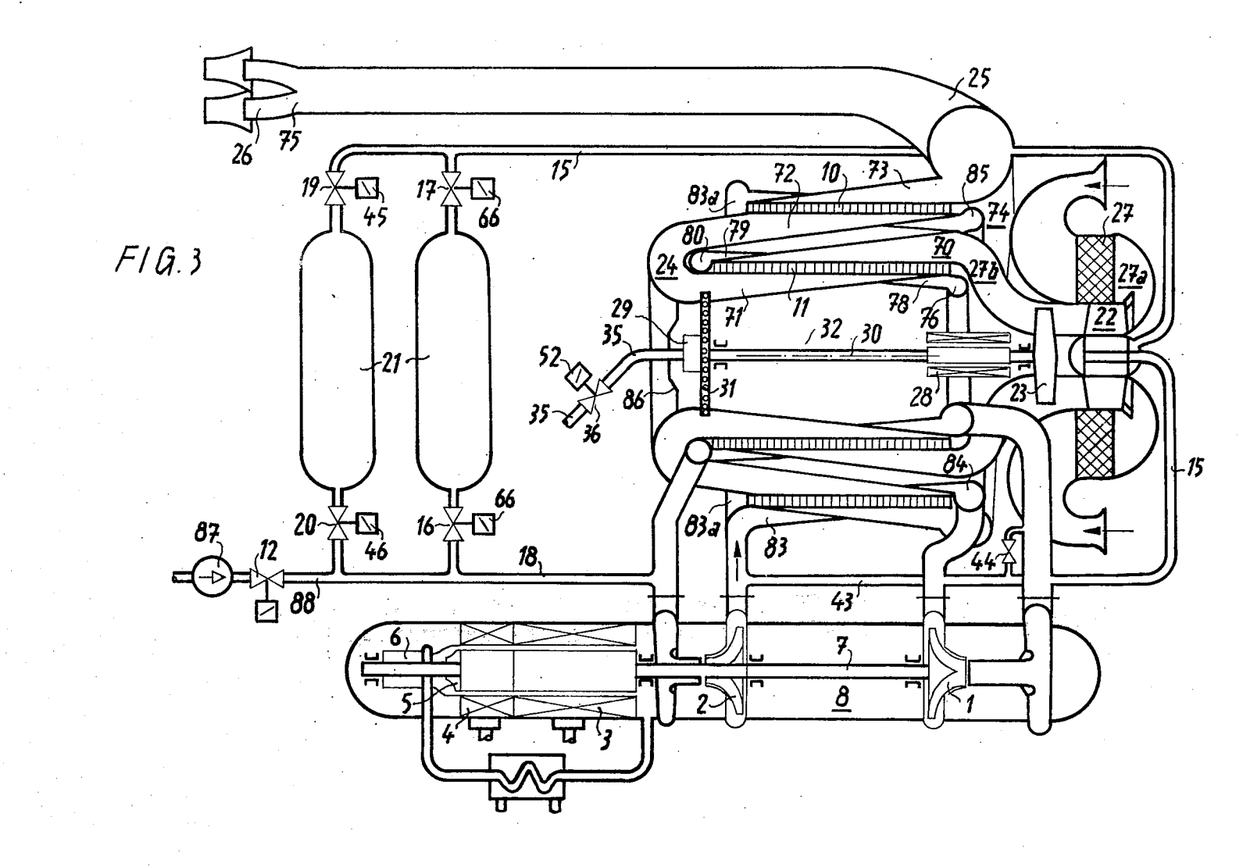
FIG. 3 is a longitudinal section and a partial diagrammatical illustration of a particularly advantageous embodiment of a gas turbine plant of FIG. 1.

FIG. 3 shows an embodiment of the gas turbine plant according to the invention, in which for purposes of simplification, the control device has not been shown. With this embodiment, the heat exchanger serving as heater 10 and the heat exchanger following the turbine 1 and representing a cooler 11 are cylindrical and are arranged coaxially with regard to each other. Furthermore, the turbo set comprising the turbine 1 and the compressor 2 is arranged on a shaft 7 while additionally there is provided a generator 3 which is directly driven by the turbo set. The air withdrawn from the atmosphere and drawn into the blower 23 passes in the direction of the arrow through a suction opening having the shape of a ring gap to the air filter 27 and from there through a conduit 27a extending along the storage gas cooler 22 to the axial blower 23 which is mounted in an overhung manner. Arranged on the shaft of the axial blower 23 and the drive motor 28 with variable speed and a centrifugal governor 29 for controlling the fuel control valve 36 and the fuel atomizer 31 into which the fuel conveying conduit 35 leads. Coaxially with said blower and said shaft 30 and also coxially with regard to each other there are arranged an air heater 11 and a heater 10.

With this arrangement, the air coming from the blower 23 is conveyed through the annular collecting chamber 27b on the outside of the air preheater 11 through the conical gas distributor 70 to the air preheater 11. After the preheated air has passed radially from the outside toward the inside through the air preheater 11 the preheated air passes through the conical gas collector 71 to the annular combustion chamber 24.

From here the combustion gas passes through a hollow conical-shaped gas distributor 72 radially from the inside toward the outside through the heat exchanger 10 in which the combustion gases are cooled and subsequently pass through a hollow conical gas collector 73 through a spiral housing 74 and from there through exhaust gas conduit 25 into the surrounding air. At the end of conduit 25 there are provided exhaust pipes 75 and air mixers 26 placed thereupon.

On the container 8 in which, as will be evident from FIG. 3, there are provided turbine 1, compressor 2, and the generators 3 and 4 driven by the turbo set, there are provided a total of four gas conduit connections for connection with the cylindrical heater 10 and the likewise cylindrical cooler 11. The working medium coming from the compressor 2 are conveyed to a spiral housing 83a and are then conveyed to the heat exchanger serving as heater 10, through a gas distributor 83 arranged on the outer circumference of the heat exchanger 10. The heater 10 is passed through radially from the outside toward the inside. On the inner circumference of the heater 10, the working medium is collected in gas collectors 84 and is conveyed to a spiral housing 85. From here the working medium passes through the turbine inlet at the container 8. After expansion in the turbine 1, the gas is conveyed to a spiral 76 provided on the inner circumference of the cooler 11. The gas conveying means toward the spiral 76 penetrates the annular conduit 76b which leads from the collecting chamber 71 for the gas in the outer circuit to the blower 23. The arrangement is such that the outer penetration is gas tight, whereas the inner penetration is not gas tight. From the spiral 76, the working medium passes through gas distributors 78 arranged on the inner circumference of the cooler 11 and through said gas distributors to the cooler 11. The cooler 11 is passed through radially from the inside toward the outside. The gas which escapes through the gas collectors 79 located on the outside of the cooler 11 is then conveyed to the spiral 80 and from there to the compressor inlet on container 8 where the gas is compressed to the upper position pressure. The communicating conduit from the spiral 80 to the container 8 penetrates the combustion chamber 24 while the areas of the penetration are gas tight.

The chamber intended for receiving the blower motor 28, which chamber is separated from the combustion chamber 24 by the atomizer 31 is, with regard to the surrounding closed by means of a closure 86. The pressure in said chamber corresponds to the air pressure generated by the blower 23. For post feeding working medium to make up for the loss of working medium due to leakage, there is provided an air pump 87 with the subsequent feed valve 12.

Figure 4:
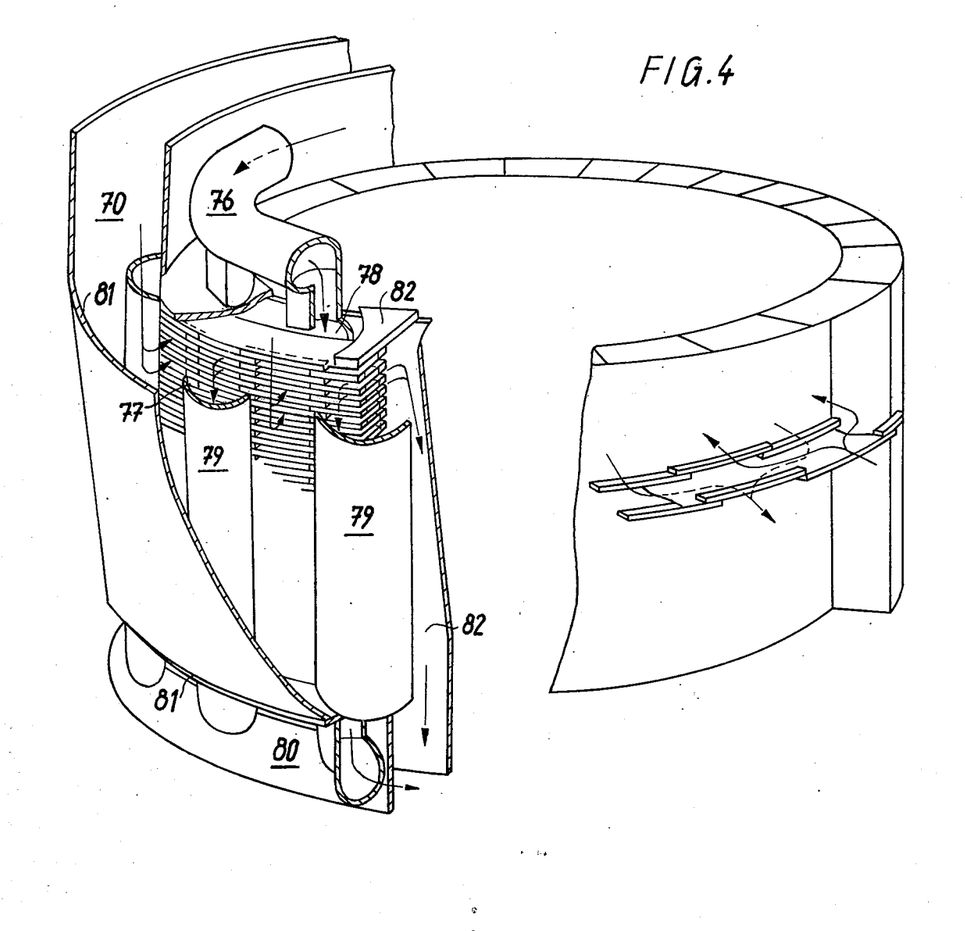
FIG. 4 shows partially in section an embodiment of a heat exchanger of the gas turbine plant of FIG. 3 while said heat exchanger is used as cooler for the gas of the closed gas circuit. The object underlying the present invention has been realized by the combination of the following features.

As will be evident from FIG. 4, with the cylindrical design of the heat exchangers, the working medium of the closed gas circuit is, for instance, through a gas conduit 76 conveyed to gas distributors 78 which in the longitudinal direction are welded to the inside of the heat exchanger matrix 77. The gas distributors 78 are respectively closed in a gas tight manner on that side thereof which is located opposite the gas inlet. When the working medium of the closed gas circuit passes through the matrix 77 from the side of the cylindrical heat exchanger in the direction toward the outer circumference, the working medium will be received by the gas collectors 79 which at one end are closed in a gas-tight manner, said gas collectors 79 are in longitudinal direction welded to the matrix. From here the working medium is conveyed to a spirally shaped gas discharge 80 which is arranged on that end of the heat exchanger which is located opposite to the gas feed 76. The working medium is then passed through the gas discharge 80 to the combustion chamber 24. The gas collectors 79 are surrounded by a cover 81, whereas the gas collectors 78 are surrounded by a cover 82.

It is, of course, to be understood that the present invention is, by no means, limited to the specific showing in the drawing, but also comprises any modifications within the scope of the appended claims.

What is claimed is:

1. In a power plant; a compressor, and a gas turbine on a common shaft and means to withdraw power from the shaft, a drive motor on the shaft for starting the shaft, conduit means forming an inner gas circuit connecting said compressor and turbine in closed circuit, gas storage means having a gas pressure intermediate of the pressure of the upstream side and the downstream side of said compressor and having valved connections with the upstream and downstream sides of said compressor, a gas heater in said conduit on the upstream side of said turbine and a gas cooler in said conduit on the downstream side of said turbine, a bypass having a controllable flow area between the upstream and downstream side of said compressor an outer gas circuit for an ignitable mixture of burning gas, a blower for said gas, a burner with a combustion chamber located in a direction of the gas flow behind said blower and said outer gas circuit being in heat exchange relation with said cooler before burning and after burning being in heat exchange relation with said heater, the burning gas being composed of air and a gaseous fuel, the outer gas circuit being open to the atmosphere at both ends, an ignition device for the combustion chamber, fuel supply means connected to said combustion chamber, gas supply means connected to said conduit means to supply gas thereto to maintain a predetermined minimum pressure in said conduit means; control means for controlling the pressure in said conduit means and operable to control said valved connections of said gas storage means and the effective area of said bypass being controlled thereby along with the speed of said blower and for controlling the supply of fuel to said combustion chamber; control means for controlling the energization of said drive motor and the actuation of said ignition device; and a monitoring device for detecting the speed of said shaft and operable to control the effective area of said bypass.

2. A power plant according to claim 1 in which said gas storage means comprises gas accumulator means, and valves between the accumulator means and the high and low pressure regions of said conduit means.

3. A power plant according to claim 1 which includes a heat exchange coil connected between said gas storage means and the downstream side of said compressor, said heat exchange coil being disposed in the outer gas circuit near the inlet end thereof whereby air entering said outer gas circuit cools the coil.

4. A power plant according to claim 1 in which said heater and cooler form a unit comprising a housing having first means therein inside the outer and inner walls.

5. A power plant according to claim 1 in which said bypass is a conduit having a controllable valve therein.

6. A power plant according to claim 1 in which said turbine and compressor are axial flow units.

7. A power plant according to claim 1 in which said turbine and compressor are radial flow units.

8. A power plant according to claim 1 which includes a pressure measuring device connected to the upstream side of said compressor and operatively connected for controlling the speed of said blower.

9. A power plant according to claim 8 in which said pressure measuring device also controls said bypass so as to vary the flow therethrough inversely to the measured pressure.

10. A power plant according to claim 1 which includes fluid bearing means journaling said shaft.

11. A power plant according to claim 1 in which said means for withdrawing power from said shaft is a generator on said shaft, a housing enclosing said compressor and turbine and generator, and means for maintaining the inside of said housing under gas pressure.

12. A power plant according to claim 11 which includes coolant air passages in said generator, a coolant blower on said shaft in said housing connected to supply cooling air to said generator passages, said coolant blower having the inlet opening into the housing, a heat exchange coil connected between the coolant blower outlet and the generator passages, and means for supplying cooling air from the blower in said outer circuit to said coil for cooling the coil.

13. A power plant according to claim 12 which includes means for varying the speed of said coolant blower in conformity with the power output of said generator.

14. A power plant according to claim 1 in which said heater and cooler include disc-shaped heat exchange matrices, the heat exchange media from said conduit means and from said outer circuit flowing in counterflow through said matrices.

15. A power plant according to claim 14 which includes inlet and oulet conduits for the heat exchange media and operable to maintain each medium isolated from the other.

16. A power plant according to claim 1 in which at least one of said heater and cooler is cylindrical and include heat conductive members through which the heat exchange media flow in the axial direction.

17. A power plant according to claim 1 in which said heater and cooler are cylindrical and coaxial with the heater on the inside, the gases from said burner flowing inwardly through the heater from the outside toward the inside while the gas from said blower flows outwardly from the inside of the cooler toward the outside.

18. A power plant according to claim 1 in which said heater and cooler comprise annular heat conductive members, conduits extending longitudinally along said members on the inside and outside, said members permitting the heat exchange media to flow between said conduits in heat exchange relation with said members while maintaining each medium isolated.

19. A power plant according to claim 18 in which said members are in the form of plates and are in axially spaced aligned relation.

20. A power plant according to claim 19 in which said blower and burner are arranged coaxially with said heater and cooler.

21. A power plant according to claim 20 which includes an annular combustion chamber on the downstream side of said burner.

22. A power plant according to claim 1 which includes a fuel atomizer upstream from said burner and connected to receive fuel from said fuel supply means.

23. A power plant according to claim 1 in which said control means includes a control device which is connected in controlling relation to the valved connections of said gas storage means and is also adapted for controlling the effective area of said bypass, said control device including spring loading and a pressure member opposed to the spring and connected to said conduit means, a speed sensitive control device actuated by said shaft and also controlling the effective area of said bypass and also controlling the supply of fuel to said burner.

24. A power plant according to claim 1 which includes temperature sensitive means associated with said burner and operable to control the supply of fuel to the burner to maintain the temperature at the burner below a predetermined maximum.

25. A power plant according to claim 1 in which said fuel supply means comprise a pressurized fuel tank.

26. A power plant according to claim 1 which includes an exhaust gas passage leading from said burner to the atmosphere and at the exit end comprising a mixing device for mixing the exhaust gases with air.

* * * * *